United States Patent [19]

Bykhovsky et al.

[11] 4,024,373
[45] May 17, 1977

[54] APPARATUS FOR PLASMA WORKING OF ELECTRICALLY-CONDUCTIVE MATERIALS AND METHOD OF OPERATING SAME

[76] Inventors: David Grigorievich Bykhovsky, Konjushenny pereulok, 1/6, kv. 18; Alexandr Yakovlevich Medvedev, ulitsa Kalyaeva, 3, kv. 17, both of Leningrad, U.S.S.R.

[22] Filed: May 5, 1976

[21] Appl. No.: 683,509

Related U.S. Application Data

[63] Continuation of Ser. No. 481,399, June 20, 1974, abandoned.

[52] U.S. Cl. .............................. 219/121 P; 219/75
[51] Int. Cl.² ............................................ B23K 9/00
[58] Field of Search ............ 219/121 P, 74, 75, 137

[56] References Cited

UNITED STATES PATENTS

| | | | |
|---|---|---|---|
| 3,027,447 | 3/1962 | Browning et al. ................... 219/75 |
| 3,180,967 | 4/1965 | Hill ................................. 219/75 X |
| 3,209,193 | 9/1965 | Sheer et al. ..................... 219/75 X |
| 3,214,623 | 10/1965 | Sheer ............................. 219/75 X |
| 3,272,962 | 9/1966 | Mauskapf ................... 219/121 P X |
| 3,317,704 | 5/1967 | Browning ................... 219/121 P X |
| 3,336,772 | 1/1968 | Wickham et al. ............. 219/121 P |
| 3,436,516 | 4/1969 | Swift ............................. 219/75 X |
| 3,463,957 | 8/1969 | Fuksiewicz ..................... 219/75 X |

*Primary Examiner*—J. V. Truhe
*Assistant Examiner*—Mark H. Paschall

[57] ABSTRACT

An apparatus for plasma working of electrically-conductive materials wherein a gas-cooled non-consumable electrode, insulator and a gas-cooled nozzle of a plasmatron are interlinked with one another so as to form a chamber subdivided by a gas-permeable partition so that one of its parts communicates with the atmosphere through a central passage of the nozzle serving to discharge plasma-forming gas and the other part of the chamber communicates with a source of plasma-forming and cooling gas and also with the atmosphere through an additional passage, the non-consumable electrode passing through this partition and being disposed coaxially with the central passage of the nozzle.

10 Claims, 4 Drawing Figures

APPARATUS FOR PLASMA WORKING OF ELECTRICALLY-CONDUCTIVE MATERIALS AND METHOD OF OPERATING SAME

CROSS RELATED APPLICATION

This application is a continuation of co-pending application Ser. No. 481,399 filed June 20, 1974 now abandoned.

The present invention relates to apparatus for plasma working of electrically-conductive materials and more specifically to apparatus for plasma working of metals in chemically active gases.

The preferable application of the apparatus is to the manual plasma cutting of metals with the use of compressed air or oxygen. Apart from that, the apparatus can be used to advantage in manual or mechanized fetting of castings and cleaning of rolled products.

Apparatus for plasma working, referred to as plasma guns, are widely known at present (U.S. Pat. No. 2,806,124; cl. 219–121). Also known are a variety of improvements to plasma guns and processes taking place therein, all aimed at providing a portable gas-cooled plasma gun (USSR Inventor's Certificate No. 145,950; class 21h3002). The known plasma gun contains a tungsten electrode and a copper nozzle both cooled by compressed air introduced into the plasma gun. The known plasma gun employs argon or a mixture of argon with air as the plasma-forming gas. The known plasma gun has proved its value as a means of cutting non-ferrous metals and stainless sheet steel not exceeding 30 mm in thickness. Yet, in cutting low-carbon steel it has failed to compete successfully with conventional manually-operated oxy-acetylene torches.

In an effort to save on the cost of plasma cutting and add to the competitive capability of the process with regard to the oxy-acetylene torch in cutting steel, there have been disclosed plasma guns employing air or oxygen as the plasma-forming medium.

Thus, know in the art is a plama gun (U.S. Pat. No. 3,366,772; class 219 –121) wherein compressed air is fed into a chamber formed by an electrode and a nozzle with a central passage for dicharging plasma-forming gas, said electrode consisting of a holder and a zirconium insert. The central passage of the nozzle runs coaxially with the zirconium insert and there are a number of additional passages in the nozzle which are located concentrically around the central passage and serve to communicate the chamber with the atmosphere. Under the conditions when the total amount of air consumed varies in the range between 5.6 and 11.3 m$^3$/hr, said plasma gun assures quality cutting of sheet steel. However, an intensive cooling of the plasma gun, or at least of the electrode, by water is indispensable in operation. Furthermore, under the given conditions of operation, which are an arc current of 275 A and a total air consumption at a rate of about 7.1 m$^3$/hr, it appears that an intensive water cooling of the nozzle is also a "must" to assure normal functioning.

In this connection it is obvious that said plasma gun cannot be used as a fully portable one, for manual plasma working. The necessity of water cooling excludes the possibility of using the known plasma gun in the field at sub-zero temperatures or in localities lacking water.

Consequently, portable air-cooled plasma guns fail to compete at present with oxy-acetylene torches in terms of both output and the quality of cutting sheet steel, in that plasma guns making use of air or oxygen as the plasma-forming medium are neither portable nor all-weather tools because the electrode with the zirconium insert and the nozzle need to be water cooled.

It is an object of the present invention to provide a portable apparatus for manual plasma working of electrically-conductive materials wherein a gas of the same chemical composition is used for the formation of the plasma and for the cooling of the parts exposed to heating in the plasma gun.

Another object of the present invention is to provide an apparatus for plasma working of electically-conductive materials wherein compressed air or oxygen is used as the plasma-forming and cooling gas.

A further object of the present invention is to provide an apparatus wherein an optimum relationship between the rate of flow of the plasma-forming gas and that of the cooling gas is maintained, both gases being of the same chemical composition.

An additional object of the present invention is to provide an apparatus wherein the bulk of the cooling gas and all the heated components of the apparatus take part in the working of the material.

The above objects are attained by an apparatus for plasma-working of electically-conductive materials comprising a d.c. power source whose positive terminal is connected to the workpiece and whose negative terminal is connected to a gas-cooled non-consumable electrode of a plasma-tron made up of an insert and a holder, an insulator slipped on the electrode, a gas-cooled nozzle of the plasmatron provided with a central passage for discharging plasma-forming gas and attached to the electrode so that the elctrode, insulator and nozzle form a chamber communicating with the atmosphere through the central passage of the nozzle running coaxially with the insert and through at least one additional passage, and also a source of plasma-forming and cooling gases, the chamber being subdivided in accordance with the invention into two parts by a gas-permeable partition so that one of the parts communicates with the atmosphere through the central passage and the other part communicates both with the atmosphere by way of the additional passage and also with the source of plasma-forming and cooling gas, the electrode passing through said partition.

It is expedient that the nozzle and at least a portion of the insulator are covered from the outside by a shield so that between them there is a gap communicating with the chamber through said additional passage, the shield being provided with holes to enable the cooling gas to escape to the atmosphere.

It is also expedient that in the apparatus, the material of the holder is copper or copper-based alloys and that of the insert is hafnium or hafnium-based alloys.

It is further expedient that in the apparatus the holder is made hollow, and a pipe connected to the source of plasma-forming and cooling gases is admitted into the bore of said holder, said bore also communicating by way of passages to that part of chamber which communicates with the atmosphere through the additional passage.

It is preferable that in the operation of the apparatus of gases used for the formation of plasma and cooling are of the same chemical composition.

It is also preferred that the plasma-forming and cooling gases is either compressed air or oxygen.

It is further preferred that in the operation of the apparatus, the aggregate rate of flow of the gas fed into the apparatus is between 60 and 100 m³/hr, the amount of plasma-forming gas being at least 7 percent of the aggregate rate of flow.

The invention disclosed herein allows provision of an apparatus for plasma working of electrically-conductive materials, preferably the cutting and surface treatment of metals, adopted for an operating current of up to 300 A and employing either compressed air or oxygen for plasma forming and cooling. When operating with compressed air and a current of up to 300 A, the apparatus assures manual cutting of low-carbon steel, aluminum and alumi-alloys with a thickness of up to 40 mm; in the case of copper and its alloys the thickness to be cut is up to 30 mm. The apparatus is adapted for operation in any weather conditions and may be used to advantage in shipbuilding, the laying of pipelines and other outdoor jobs. An apparatus consuming oxygen and a current of up to 300 A is capable of cutting 50-mm low-carbon steel to high standards and also can clean ingots, slabs and other rolled products.

The present invention will be best understood from the following detailed description of a preferred embodiment taken in conjuction with the accompanying drawings in which.

Figure 1:
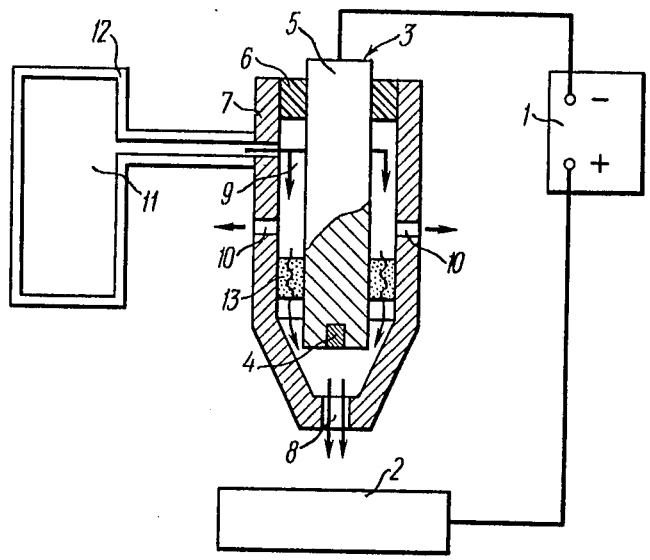
FIG. 1 is a diagramatic section of apparatus for plasma working.

Referring to FIG. 1, the apparatus for plasma working of electrically-conductive materials has a d.c. power source 1 whose positive terminal is connected to a workpiece 2 and whose negative terminal is connected to a gas-cooled non-consumable electrode of a plasmatron, the electrode comprising an insert 4 and a holder 5. Slipped on the non-consumable electrode 3 is an insulator 6 which is attached to a gas-cooled nozzle 7 the plasmatron provided with a central passage 8 for discharging plasma-forming gas. The non-consumable electrode 3, insulator 6 and nozzle 7 define a chamber 9 communicating with the atmosphere through the central passage 8, the passage running coaxially with the insert 4 of the non-consumable electrode 3. The chamber 9 also communicates with the atmosphere via a plurality of additional passages 10. A source of plasma-forming and cooling gas 11 communicates with the plasmatron through a pipe 12. The chamber 9 is subdivided into two parts by a gas-permeable partition 13 such that the electrode 3 passes through the partition 13 and the lower part of the chamber communicates with the atmosphere through the central passage 8 of the nozzle 7 whereas the upper part of the chambers communicates both with the atmosphere via the additional or passages 10 and also with the source of plasma-forming and cooling gas 11 through the pipe 12.

The holder 5 of the non-consumbale electrode 3 is made of copper or copper alloy and the material of the insert 4 of the non-consumable electrode 3 is either hafnium or its alloys.

The gas-permeable partition 13 is either a porous insulator or its material can be a dense one, provided the partition is pierced by a plurality of through holes.

The main requirement to be met by the gas-permeable partition 13 is its resistance to the flow of gas. If this resistance is assumed to be equal to unity, then the optimum relationship between the resistances to the flow of gas through the central passage 8 of the nozzle 7 and through the additional passages 10 is 1:3:16, respectively. This resistance may vary in the range between 1:2:12 and 1:3.5:20, a variable resistance of the gas-permeable partition 13 also being tolerable.

The disclosed apparatus for plasma working of electrically conductive materials operates in the following manner. Electric supply from the d.c. power source 1 causes an arc obtaining struck between the insert 4 of the non-consumable electrode 3 and the workpiece 2 resulting in a flow of a plasma-forming gas which passes through the central passage 8 along with the arc stream. An aggregate flow of a plasma-forming and cooling gas is fed from the source of the gas 11 into the chamber 9 via the pipe 12, cooling the holder 5 of the electrode. That part of the aggregate flow which cools the nozzle 7 is discharged into the atmosphere and the rest of the aggregate flow, which is the plasma-forming gas proper, passes through the gas-permeable partition 13, is ionized in the arc stream and outlfows on the workpiece 2 in the form of a plasma jet, The plasma-forming and cooling gas is a gas of the same chemical composition which is either compressed air or oxygen.

The above principle of operation is based on studies of the performance of the electrode 3 with the hafnium insert 4 in a medium of chemically active gases, compressed air or oxygen in particular, under the conditions of gas cooling. Subject to study was also the allowable magnitude of the arc current in the central passage 8 of the nozzle 7 and the allowable rate of flow of the plasma-forming gas which would provide for stable performance and protracted service life of the electrode 3 with the hafnium insert 4 under the conditions of gas cooling on one hand and for the stable performance and protracted service life of the nozzle 7 under the conditions of gas cooling on the other hand. Further subject to study were the design features enabling simultaneous use of a gas of the same chemical composition for both plasma-forming and cooling purposes.

Surprisingly, the results of the studies into the behavior of the electrode with the hafnium insert in air or oxygen used as the coolant and the plasma former were quite different from what was expected to occur due to the change over from cooling with water to cooling with gas. Instead of an anticipated shortening of the service life of the elctrode with the hafnium insert cooled by gas based on the fact that the rate of heat transfer from the copper holder of the electrode to gas is less by roughly three orders of magnitude than that from the copper holder to water, it has been discovered that the electrode with the hafnium inset, on being heated in the vicinity of the holder to between 200° and 300° C, automatically reduced the current density of the end face of the hafnium insert where the cathode spot of the arc is located. This phenomenon is accompanied by a reduction of the heat input into the electrode which is a factor extending the service life of the hafnium insert. This cannot occur under the conditions of water cooling because in this case it is the temperature of boiling which controls the average temperature of the hafnium insert.

Figure 2:
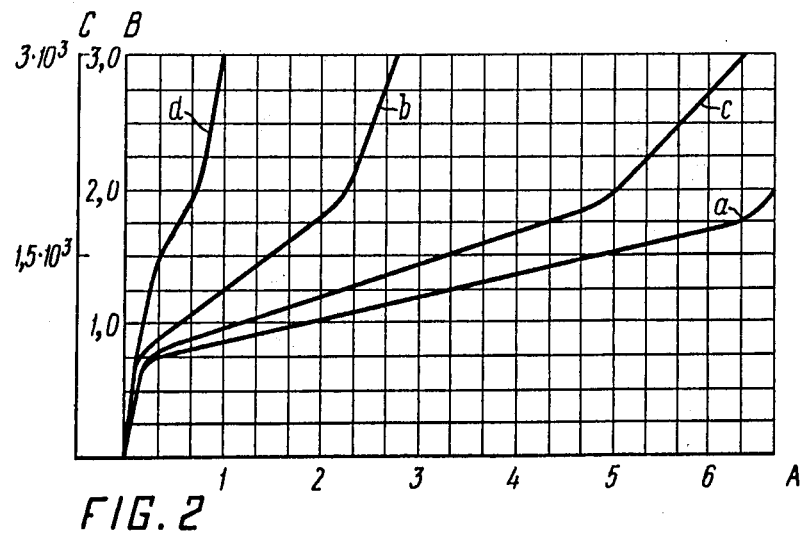
FIG. 2 is a graph showing curves illustrating the way in which the flow of heat is being changed.

The results of probing into the performance of the apparatus disclosed are illustrated in FIG. 2, in which the period of operation of the apparatus in hours (abscissa A) is plotted against the linear erosion in millimeters (ordinate B) and the heat input into the electrode in watts (ordinate C).

Curve a provides an insight into the way the heat input into the non-consumable electrode is changing and at the same time shows the amount of linear erosion of the hafnium insert at an arc current of 250 A, a rate of flow of plasma-forming air equal to 4.5 m³/hr and an aggregate rate of flow of plasma-forming and cooling air equal to 80 m³/hr. The rate of gas flow is reduced here and elsewhere to a pressure of 760 mm Hg.

Curve b depicts the changes in the heat input into the non-consumable electrode and also the amount of linear erosion of the hafnium insert occuring at an arc current of 250 A, a rate of flow of plasma-forming air equal to 2.5 m³/hr and an aggregate rate of flow of plasma-forming and cooling air equal to 40 m³/hr.

Curve c indicates the changes in the heat input into the non-consumable electrode and also the amount of linear erosion of the hafnium insert occuring at an arc current of 250 A, a rate of flow of plasma-forming air equal to 4.5 m³/hr and an aggregate rate of flow of plasma-forming and cooling air equal to 70 m³/hr. Curve d indicates for the sake of comparison the results of similar tests of the electrode with the hafnium insert under the conditions when the rate of aggregate flow of plasma-forming and cooling air was 80m³/hr.

The studies so far undertaken have shown that the aggregate flow of the plasma-forming and cooling gas which will provide for a commercially-acceptable period of service life of the apparatus must be maintained at a rate varying in the range between 60 and 100 m³/hr, the flow of plasma-forming gas being at a rate which is at least 7% of the aggregate rate of flow. The upper limit of the aggregate rate of gas flow is determined by the maxiumum tolerable rate of flow of plasma-forming gas above which the service life of the hafnium insert is drastically reduced. Some studies have established that the operating current of the apparatus varies in the range between 100 and 300 A.

Figure 3:
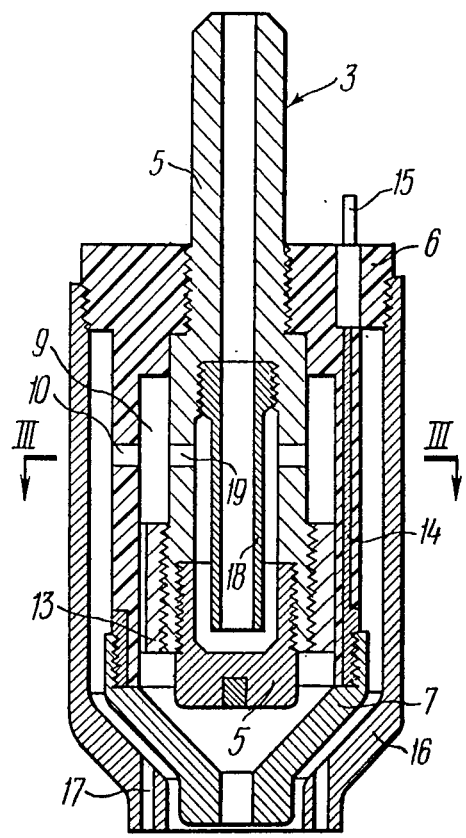
FIG. 3 is a diagramatic section of the apparatus for plasma working of electrically-conductive materials according to the invention showing constructural features.
Figure 4:
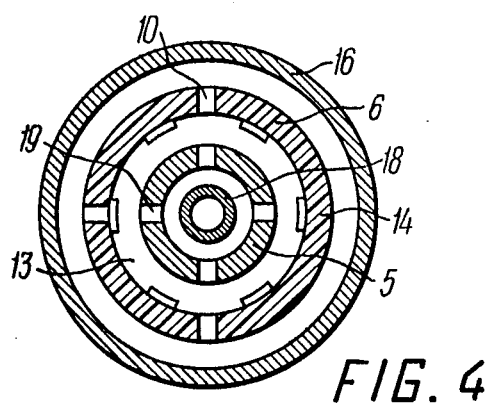
FIG. 4 is a section taken on line III — III in FIG. 3.

FIGS. 3 and 4 illustrate a preferred embodiment of a plasmatron according to the present invention. The same minerals are used to designate the same elements shown in FIG. 1. The non-consumable electrode 3 of the plasmatron is made up of copper holder 5 with hafnium insert 4 disposed therein. The electrode 3 is coupled with insulator 6 by means of a threaded sleeve 14 with a terminal post 15. The sleeve 14 also provides a means of connecting the insulator 6 to copper nozzle 7 which has central passage 8 serving to discharge the plasma-forming gas. The non-consumable electrode 3, insulator 6 and nozzle 7 define chamber 9 of the plasmatron. The chamber 9 communicates with the atmosphere through the central passage 8 running coaxially with the insert 4 of the non-consumable electrode 3 and further communicates with the atmosphere through additional passages 10. The chamber 9 is subdivided into two parts by gas-permeable partition 13 so that the electrode 3 passes through the partition 13 and the lower part thereof communicates with the atmosphere through the central passage 8 of the nozzle 7 and the upper part thereof communicates with the atmosphere through the additional passages 10. The nozzle 7 and part of the insulator 6 are overlaid from the outside with a shield 16 so that between them there is a gap communicating with the chamber 9 through the additional passages 10. The shield 16 is provided with a plurality of holes 17 which enable the cooling gas to escape.

The holder 5 is made hollow and is provided with a pipe 18 serving to admit a plasma-forming and cooling gas into the bore of the holder 5. Said bore communicates through passages 19 with that part of the chamber 9 which communicates with the atmosphere through the additional passages 10. The plasma-forming and cooling gas (air or oxygen) is fed into the pipe 18 of the non-consumable electrode 3 from a pipeline. The negative terminal of the source of power is connected to the electrode 3 and the terminal post 15 is connected to a standard arc-generating arrangement. The plasmatron shown in FIGS. 3 and 4 operates in the same way as the apparatus illustrated in FIG. 1.

The plasmatron of FIGS. 3 and 4 was tested under the conditions of manual cutting of metals in air and oxygen. The results have proved that under the operating conditions stated hereinabove the plasmatron is capable of a productive cutting of low-carbon steels with a thickness of 40 mm in air and of quality cutting of low-carbon steels up to 50 mm thick in oxygen. Good results were also obtained in cutting 30-mm copper.

What is claimed is:

1. An apparatus for plasma working of electrically-conductive materials comprising: a d.c. source of power whose positive terminal is connected to the workpiece; a plasmatron including a gas-cooled non-consumable electrode; comprising an insert and a holder; means connecting the electrode to the negative terminal of said d.c. power source; an insulator on said non-consumable electrode; a nozzle member fitted on said insulator and having a central passage for discharging plasma-forming gas; said non-consumable electrode, insulator and nozzle defining a chamber communicating with the atmosphere through said central passage; at least one additional passage means connecting said chamber with the atmosphere; a source of plasma-forming and cooling gas connected to said chamber at a location spaced from said additional passage means; a gas-permeable partition disposed in said chamber such that said non-consumable electrode passes through said partition which subdivides said chamber into two parts one of which communicates with the atmosphere through said central passage and the other of which communicates both with said source of plasma-forming and cooling gas and also with the atmosphere by way of said additional passage means.

2. An apparatus as claimed in claim 1 wherein said central passage is coaxial with said insert.

3. An apparatus as claimed in claim 1 wherein said gas permeable partition provides resistance to gas flow from said source to said passage in the nozzle member and provides a ratio of gas flow between the nozzle member and said additional passage means between 2:12 and 3.5:20.

4. An apparatus as claimed in claim 1 comprising a shield covering said nozzle member and at least a portion of said insulator to define therewith a gap communicating with said chamber through said additional passage means, said shield being provided with holes to enable the cooling gas to escape.

5. An apparatus as claimed in claim 1 wherein said holder is made of copper or a copper-based alloy and said insert is made of hafnium or a hafnium-based alloy.

6. An apparatus as claimed in claim 1 wherein said holder is hollow, a pipe disposed in said holder and connected to the source of plasma-forming and cooling gases for admitting the gas into said holder, said holder having passages extending to that part of said chamber which communicates with the atmosphere through the additional passage means.

7. An apparatus as claimed in claim 1 wherein said additional passage means is constituted by at least one hole in said nozzle member.

8. An apparatus as claimed in claim 1, wherein the plasma-forming and cooling gas is compressed air.

9. An apparatus as claimed in claim 1, wherein the plasma-forming and cooling gas is oxygen.

10. An apparatus as claimed in claim 1, wherein the aggregate gas flow rate is between 60 cu.m/hr to 100 cu.m/hr, the proportion of plasma-forming gas being at least 7 percent of the aggregate gas flow rate.

* * * * *